United States Patent
K et al.

(10) Patent No.: US 11,385,972 B2
(45) Date of Patent: Jul. 12, 2022

(54) VIRTUAL-MACHINE-SPECIFIC FAILOVER PROTECTION

(71) Applicant: VMware, Inc., Palo Alto, CA (US)

(72) Inventors: Charan Singh K, Sunnyvale, CA (US); Fei Guo, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 146 days.

(21) Appl. No.: 16/453,348

(22) Filed: Jun. 26, 2019

(65) Prior Publication Data

US 2020/0409806 A1    Dec. 31, 2020

(51) Int. Cl.
| | |
|---|---|
| *G06F 9/46* | (2006.01) |
| *G06F 11/14* | (2006.01) |
| *G06F 11/20* | (2006.01) |
| *G06F 9/50* | (2006.01) |
| *G06F 9/455* | (2018.01) |

(52) U.S. Cl.
CPC ...... *G06F 11/1484* (2013.01); *G06F 9/45533* (2013.01); *G06F 9/505* (2013.01); *G06F 11/2033* (2013.01); *G06F 2009/4557* (2013.01)

(58) Field of Classification Search
CPC ............. G06F 11/1484; G06F 9/45533; G06F 11/2033; G06F 9/505; G06F 2009/4557
See application file for complete search history.

(56) References Cited

U.S. PATENT DOCUMENTS

| | | | | |
|---|---|---|---|---|
| 9,052,935 | B1 * | 6/2015 | Rajaa .................... | G06F 9/5077 |
| 9,223,596 | B1 * | 12/2015 | Araujo ................ | G06F 9/45558 |
| 9,471,352 | B1 * | 10/2016 | Mauer .................. | G06F 9/45558 |
| 9,621,427 | B1 * | 4/2017 | Shah .................... | G06F 9/45558 |
| 9,874,924 | B1 * | 1/2018 | Li ......................... | G06F 9/45558 |
| 9,942,083 | B1 * | 4/2018 | Adogla .................. | G06F 9/5077 |
| 10,789,267 | B1 * | 9/2020 | Dhoolam .............. | G06F 3/0635 |
| 2008/0189700 | A1 * | 8/2008 | Schmidt .................. | G06F 9/455 718/1 |
| 2009/0293022 | A1 * | 11/2009 | Fries ..................... | G06F 9/5088 716/132 |
| 2010/0281482 | A1 * | 11/2010 | Pike ..................... | G06F 9/44505 718/102 |
| 2011/0023028 | A1 * | 1/2011 | Nandagopal ........ | G06F 11/2038 718/1 |
| 2011/0214005 | A1 * | 9/2011 | Biran ................... | G06F 11/2041 718/1 |
| 2011/0231696 | A1 * | 9/2011 | Ji ........................... | G06F 11/203 714/3 |
| 2012/0324444 | A1 * | 12/2012 | Gulati .................. | H04L 67/104 718/1 |

(Continued)

*Primary Examiner* — Adam Lee
(74) *Attorney, Agent, or Firm* — Thomas | Horstemeyer LLP

(57) ABSTRACT

Disclosed are various examples for virtual-machine-specific failover protection. In some examples, a power-on request is received for a protected virtual machine. Virtual-machine-specific failover protection is enabled for the protected virtual machine. The protected virtual machine is executed on a first host of a cluster, and a dynamic virtual machine slot for the protected virtual machine is created on a second host of the cluster. The dynamic virtual machine slot is created to match a hardware resource configuration of the protected virtual machine. An anti-affinity rule is maintained between the protected virtual machine and the dynamic virtual machine slot.

14 Claims, 5 Drawing Sheets

(56) References Cited

U.S. PATENT DOCUMENTS

| | | | |
|---|---|---|---|
| 2012/0331147 A1* | 12/2012 | Dutta | G06F 9/5088 709/226 |
| 2013/0227296 A1* | 8/2013 | Lee | G06F 9/45558 713/176 |
| 2013/0232493 A1* | 9/2013 | Kato | G06F 9/455 718/1 |
| 2014/0059379 A1* | 2/2014 | Ren | G06F 11/2069 714/15 |
| 2014/0372790 A1* | 12/2014 | Antony | G06F 11/2046 714/4.11 |
| 2015/0040127 A1* | 2/2015 | Dippenaar | G06F 9/5044 718/1 |
| 2015/0193245 A1* | 7/2015 | Cropper | H04L 43/08 718/1 |
| 2016/0103698 A1* | 4/2016 | Yang | G06F 11/203 714/4.11 |
| 2016/0205518 A1* | 7/2016 | Patel | H04L 67/1002 455/518 |
| 2016/0328006 A1* | 11/2016 | Aranjani | G06F 3/0634 |
| 2016/0378622 A1* | 12/2016 | Ren | G06F 11/0712 714/4.11 |
| 2017/0039120 A1* | 2/2017 | Ganesan | G06F 11/3006 |
| 2017/0060608 A1* | 3/2017 | Raghunathan | G06F 11/14 |
| 2017/0374136 A1* | 12/2017 | Ringdahl | G06F 9/45558 |
| 2019/0079791 A1* | 3/2019 | Zhong | G06F 3/0604 |
| 2019/0146888 A1* | 5/2019 | Grobman | G06F 11/203 714/4.12 |

* cited by examiner

VIRTUAL-MACHINE-SPECIFIC FAILOVER PROTECTION

BACKGROUND

Enterprises can execute business-critical workloads using virtual machines executed in host hardware, such as servers in a data center. Hardware failures can result in costly interruptions of business operations. A particular server might be running multiple virtual machines that are each executing business critical applications. As a result, enterprises can utilize various protections against hardware failures. As one example, failover protection can protect virtual machines against hardware failures by ensuring that sufficient resources are available in a hardware cluster. For example, a virtual machine can be reserved space on a secondary device in a cluster of hardware servers. Virtual machines that have experienced a hardware failure or another crash can be restarted on operational hardware.

However, existing failover protections do not provide granular control over the resource reservations for failover. Some failover protections can reserve more resources than required, leading to underutilized clusters. Other failover protections can reserve too few resources, thereby protecting fewer workloads. This can result in protection of low-priority workloads at the expense of higher priority workloads. Existing solutions do not provide a way to selectively protect critical workloads, but rather protect all workloads in the cluster. An enterprise may desire greater protections for selected workloads. As a result, there is a need for more failover protections that are closely tailored to selected workloads.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing virtual-machine-specific failover protection for one or more virtual machines. Hardware failures can result in costly interruptions to potential business critical applications and services. As a result, enterprises can utilize various protections against hardware failures. Failover protection can protect virtual machines against hardware failures by ensuring sufficient resources are available in a hardware cluster. Existing solutions do not provide a way to selectively protect critical workloads. The present disclosure describes mechanisms that enable virtual-machine-specific failover protection. A protected virtual machine can be associated with a dynamic virtual machine slot that reserves computing resources on one or more hosts. If the protected virtual machine fails, the cluster can execute the protected virtual machine using a dynamic virtual machine slot's reserved computing resources.

Figure 1:
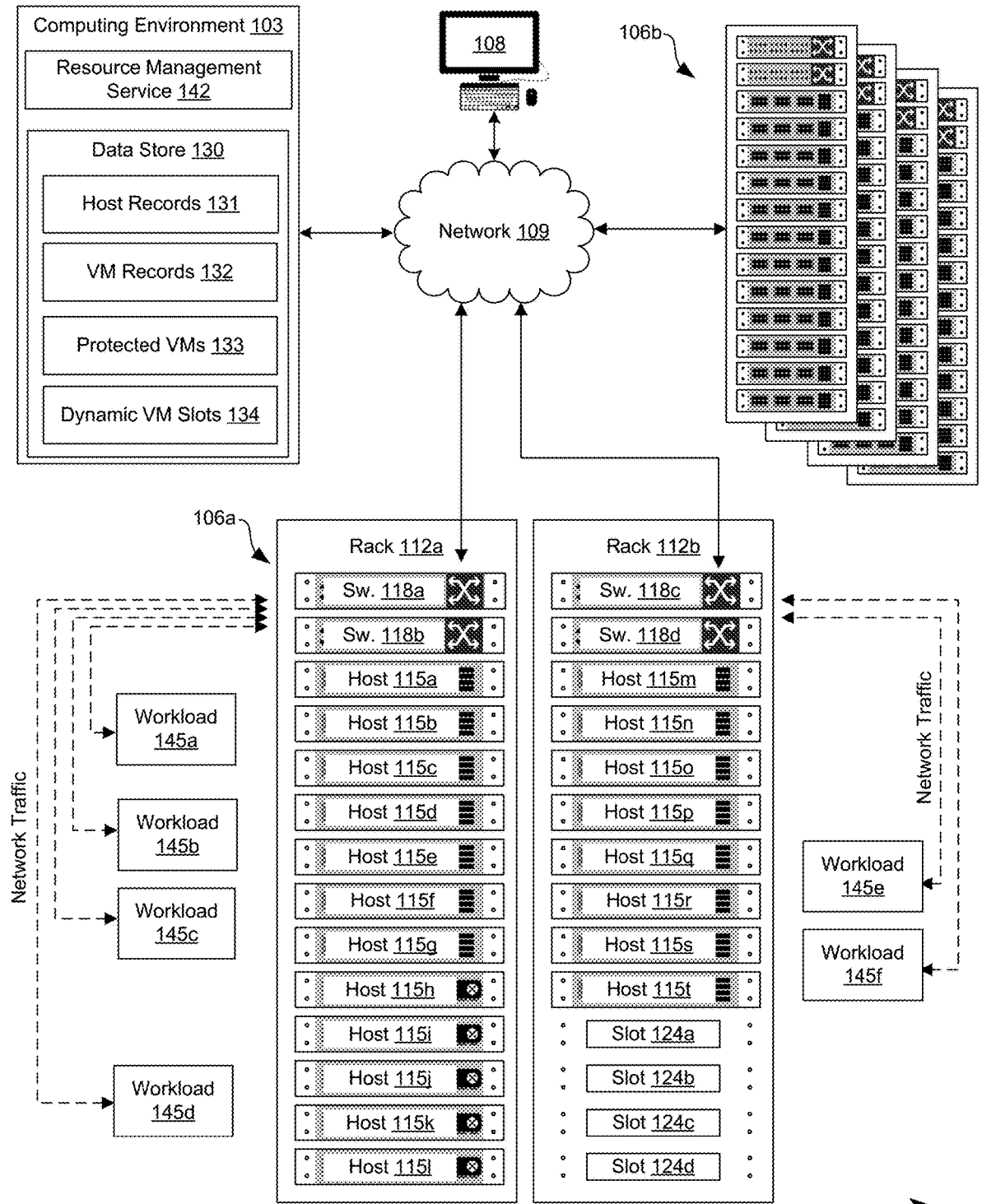
FIG. 1 is a drawing of a networked environment that includes a computing environment, a client device, and clusters of host devices, according to the present disclosure.

With reference to FIG. 1, an example of a networked environment 100 is shown. The networked environment 100 can include a computing environment 103, various computing clusters 106a . . . 106b, and one or more client devices 108 in communication with one another over a network 109. The network 109 can include wide area networks (WANs) and local area networks (LANs). These networks can include wired or wireless components, or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks. As the networked environment 100 can serve up virtual desktops to end users, the networked environment 100 can also be described as a virtual desktop infrastructure (VDI) environment.

In some examples, the computing environment 103 can include an enterprise computing environment that includes hundreds or even thousands of physical machines, virtual machines, and other software implemented in devices stored in racks 112, distributed geographically and connected to one another through the network 109. It is understood that any virtual machine or virtual appliance is implemented using at least one physical device.

The computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. Although shown separately from the computing clusters 106, in some examples, the computing clusters 106 can be a portion of the computing environment 103. Various applications can be executed on the computing environment 103. For example, a resource management service 142 can be executed by the computing environment 103. Other applications, services, processes, systems, engines, or functionality not discussed in detail herein may also be executed or implemented by the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing clusters 106 and client devices 108 for end users over the network 109, sometimes remotely, the computing environment 103 can be described as a remote computing environment 103 in some examples. Additionally, in some examples, the computing environment 103 can be implemented in hosts 115 of a rack 112 and can manage operations of a virtualized computing environment. Hence, in some examples, the computing environment 103 can be referred to as a management cluster in the computing clusters 106.

The computing environment 103 can include a data store 130. The data store 130 can include memory of the computing environment 103, mass storage resources of the computing environment 103, or any other storage resources on which data can be stored by the computing environment 103. The data store 130 can include memory of the hosts 115 in some examples. In some examples, the data store 130 can include one or more relational databases, object-oriented databases, hierarchical databases, hash tables or similar key-value data stores, as well as other data storage applications or data structures. The data stored in the data store 130, for example, can be associated with the operation of the various services or functional entities described below. For example, various host records 131, virtual machine (VM) records 132, protected VMs 133, and dynamic VM slots 134 can be stored in the data store 130.

The resource management service 142 can be executed to allocate workloads 145 to one or more hosts 115 based on various factors. For example, the resource management service 142 can add an extra host 115 to the set of hosts 115 assigned to a workload 145 in response to an increase in demand for computing resources. As another example, the resource management service 142 can reassign VMs within a workload 145 from one host 115 to another host 115 in order to more effectively use the hosts 115 assigned to the workload 145. Similarly, the resource management service 142 can also remove hosts 115 from a workload 145 and cause the removed hosts 115 to be powered off or enter a low-power consumption mode of operation (e.g., standby or sleep modes). For instance, the resource management service 142 can determine that a workload 145 being processed by five hosts 115 is only consuming the resources of an equivalent of two hosts 115. Accordingly, the resource management service 142 can remove three hosts 115 from the workload 145, cause the VMs in the workload 145 executing on the removed hosts 115 to migrate to the remaining two hosts 115 assigned to the workload 145, and send instructions to the removed hosts 115 to power off or enter a low-power mode of operation.

The resource management service 142 can include a number of modules and components that work in concert for management of the hosts 115 and workloads 145. For example, the resource management service 142 can include VSphere™ High Availability (HA), VMware Distributed Resource Scheduler (DRS), VMware vCenter™ Server, and other VMware VSphere™ components. The various components of the resource management service 142 can work in concert to achieve the functionalities described for the resource management service 142.

A host record 131 can represent information related to a host 115 used as a host for a VM. For example, the host record 131 can include information such as the amount of memory installed on the host 115, the number and type of processors installed on the host 115, the number and type of GPUs installed on the host 115, the number and type of network connections installed on the host 115, and various other data. The host record 131 can also include information related to the guest VMs currently hosted on the host 115. For example, the host record 131 can include a record of the number of guest VMs hosted on the host 115. As another example, the host record 131 can include a record of the amount and type of computer resources currently allocated to each of the guest VMs. These records can include the number of processor cores, amount of memory, amount of storage, number of GPUs, and the number of network connections. Likewise, the host record 131 can include the amount of allocated computer resources consumed by each of the guest VMs. For example, the host record 131 can include an indication that one guest VM is consuming 75% of the memory allocated to it and is using 47% of the processor resources allocated to it, while another guest VM is consuming 15% of the memory allocated to it and is using 97% of the processor resources allocated to it. The host record 131 can also include a record of the workload(s) 145 (e.g., specific VMs) performed by particular host(s) 115.

A VM record 132 can represent information related to a VM executing as a guest hosted by a host 115. For example, this information can include an identifier or name of the VM, a version and type of operating system installed on the VM. A VM record can also include the number and type of applications installed on the VM. In some implementations, the VM record 132 can also include a record of the amount and type of computer resources currently allocated to the VM. For example, the VM record 132 can include the number of processor cores, amount of memory, amount of storage, number of GPUs, and the number of network connections assigned to the VM. Likewise, the VM record 132 can include the amount of allocated computer resources consumed by the VM. For example, the VM record 132 can include an indication that the VM is consuming 75% of the memory allocated to it and is using 47% of the processor resources allocated to it. In some implementations, this information may be recorded in the VM record 132 on a historical basis. In order to track and predict the amount of resources that a VM is likely to consume, the VM record 132 may also store a session history, a record of current user sessions, as well as information related to predicted user sessions.

The VM record 132 can also include an indication of whether a particular VM is a protected VM 133. A protected VM 133 can be a VM that is configured to use one or more dynamic VM slots 134 to reserve resources for failover protection for the protected VM 133. The resource management service 142 can include a management console or user interface accessible through the client device 108. Administrative user can configure VMs through the management console. Hardware resource parameters of VMs can be entered, including memory parameters, compute parameters, network parameters, storage parameters, and others. The memory parameter can be represented in GB, GiB, or another measure of memory resources. The compute parameter can be represented in GHz, number of vCPUs, or another measure related to compute resources. While the compute parameter can be listed as a number of vCPUs, this can nevertheless be indicative of a specific hardware parameter because each vCPU can represent a hardware compute resource that will ultimately be assigned to a host 115 or hosts 115. The network parameter can be represented in Gigabits or another measure related to network resources. The storage parameter can be represented in Terabytes or another measure related to storage resources.

The resource management service 142 can receive a power-on request for a VM. In some cases, the power-on request can include a future implementation time. The management console can also obtain an implementation time (and date) when a VM such as a protected VM 133 is scheduled to be implemented. The resource management service 142 can execute the VM on a host 115 based on the request. If the VM is a protected VM 133, the resource management service 142 can also generate one or more dynamic VM slots 134 for the protected VM 133. The resource management service 142 can generate and maintain an anti-affinity rule between the protected VM 133 and its dynamic VM slots 134. The anti-affinity rule prohibits the protected VM 133 from residing on a same host 115 as the dynamic VM slot(s) 134. In some cases, each of the dynamic VM slots 134 for the protected VM 133 can also include an anti-affinity for each other. The dynamic VM slot(s) 134 for the protected VM 133 can be prohibited from residing on a same host 115 as the other dynamic VM slot(s) 134 for the same protected VM 133. As a result, a single host failure will not eliminate multiple dynamic VM slot(s) 134 for a single protected VM 133.

In addition, the management console can include a user interface element that, when selected, causes a VM to be configured as a protected VM 133. The management console can also include a user interface element that obtains a fault tolerance level for a cluster 106 or a particular protected VM 133. The resource management service 142 can determine a number of dynamic VM slots 134 based on a level of failover protection or fault tolerance. The fault tolerance level can indicate a number of host failures that should be tolerated, and the number of dynamic VM slots 134 can be equivalent to the fault tolerance level. The fault tolerance level can be set for the cluster 106, or for a particular protected VM 133.

A dynamic VM slot 134 can refer to an entity generated by the resource management service 142. A dynamic VM slot 134 can be associated with specific hardware resources reserved for failover protection of a protected VM 133. The hardware resources reserved by a dynamic VM slot 134 can match those of a protected VM 133, including one or more of its memory parameters, compute parameters, network parameters, and storage parameters.

The dynamic VM slot 134 can be continuously monitored (i.e., periodically, regularly, or on a schedule) to match the current hardware configuration of the protected VM 133. The resource management service 142 can monitor for provisioning operations that affect the protected VM 133. Provisioning operations can be entered through a client device 108 accessing the management console of the resource management service 142. Provisioning operations can increase, decrease, or otherwise alter the hardware configuration and fault protection settings for the protected VM 133. The resource management service 142 can update all dynamic VM slots 134 for the protected VM 133 in response to detected provisioning operations. This can result in the dynamic VM slot 134 being moved from one host 115 to another host 115, for example, where the previous host 115 of the dynamic VM slot 134 has insufficient resources for the updated hardware configuration. The new host 115 of the dynamic VM slot 134 can include sufficient resources for the updated hardware configuration.

In some examples, the resource management service 142 can move a dynamic VM slot 134 for load balancing purposes. For instance, the previous host 115 of the dynamic VM slot 134 can have sufficient resources for the updated hardware configuration, but the updated hardware configuration causes a utilization level of the previous host 115 to violate a threshold level, or the updated hardware configuration causes an imbalance in utilization of the various hosts 115 of the cluster.

In various embodiments, the computing clusters 106 can include a plurality of devices installed in racks 112, which can make up a server bank, aggregate computing system, or a computer bank in a data center or other like facility. In some examples, the computing cluster can include a high-availability computing cluster. A high-availability computing cluster can include a group of computing devices that act as a single system and provides a continuous uptime for workloads. The devices in the computing clusters 106 can include any number of physical machines that perform workloads that include, virtual machines, virtual appliances, operating systems, drivers, hypervisors, scripts, and applications.

The devices in the racks 112 can include, for example, memory and storage devices, hosts 115a ... 115t, switches 118a ... 118d, and other devices. Hosts 115 can include graphics cards having one or more graphics processing units (GPUs) installed thereon, central processing units (CPUs), power supplies, and other components. The devices, such as hosts 115 and switches 118, can have dimensions suitable for quick installation in slots 124a ... 124d on the racks 112. In various examples, the hosts 115 can include requisite physical hardware and software to create and manage a virtualization infrastructure. The physical hardware for a host 115 can include a CPU, graphics card (having one or more GPUs), data bus, memory, and other components. In some examples, the hosts 115 can include a pre-configured hyper-converged computing device where a hyper-converged computing device includes pre-tested, pre-configured, and pre-integrated storage, server and network components, including software, that are positioned in an enclosure installed in a slot 124 on a rack 112.

A host 115 can include an instance of a virtual machine, which can be referred to as a "guest." Each host 115 that acts as a host in the networked environment 100, and thereby includes one or more guest virtual machines, can also include a hypervisor. In some examples, the hypervisor can be installed on a host 115 to support a virtual machine execution space wherein one or more virtual machines can be concurrently instantiated and executed. In some examples, the hypervisor can include the VMware ESX™ hypervisor, the VMware ESXi™ hypervisor, or similar hypervisor. It is understood that the computing clusters 106 are scalable, meaning that the computing clusters 106 in the networked environment 100 can be scaled dynamically to include additional hosts 115, switches 118, power sources, and other components, without degrading performance of the virtualization environment. The hosts in the computing cluster 106 are monitored and, in the event of a failure, the virtual machines or virtual appliances on a failed host 115 can be restarted on alternate hosts 115.

In various examples, when a host 115 (e.g., a physical server) is added to a computing cluster 106, an agent application can be uploaded to the host 115 and configured to communicate with other agent applications in the computing cluster 106. Some of the hosts 115 in the computing cluster 106 can be designated as primary hosts, and other hosts in the computing cluster 106 can be designated as secondary hosts. The primary hosts 115, for example, can maintain and replicate states of the computing cluster 106 and can be used to initiate failover actions. Any host 115 that joins the computing cluster 106 can communicate with a host 115, such as an existing primary host 115, to complete its configuration.

Further, various physical and virtual components of the computing clusters 106 can process workloads 145*a* . . . 145*f*. Workloads 145 can refer to the amount of processing that a host 115, switch 118, GPU, or other physical or virtual component has been instructed to process or route at a given time. The workloads 145 can be associated with virtual machines or other software executing on the hosts 115.

Figure 2A:
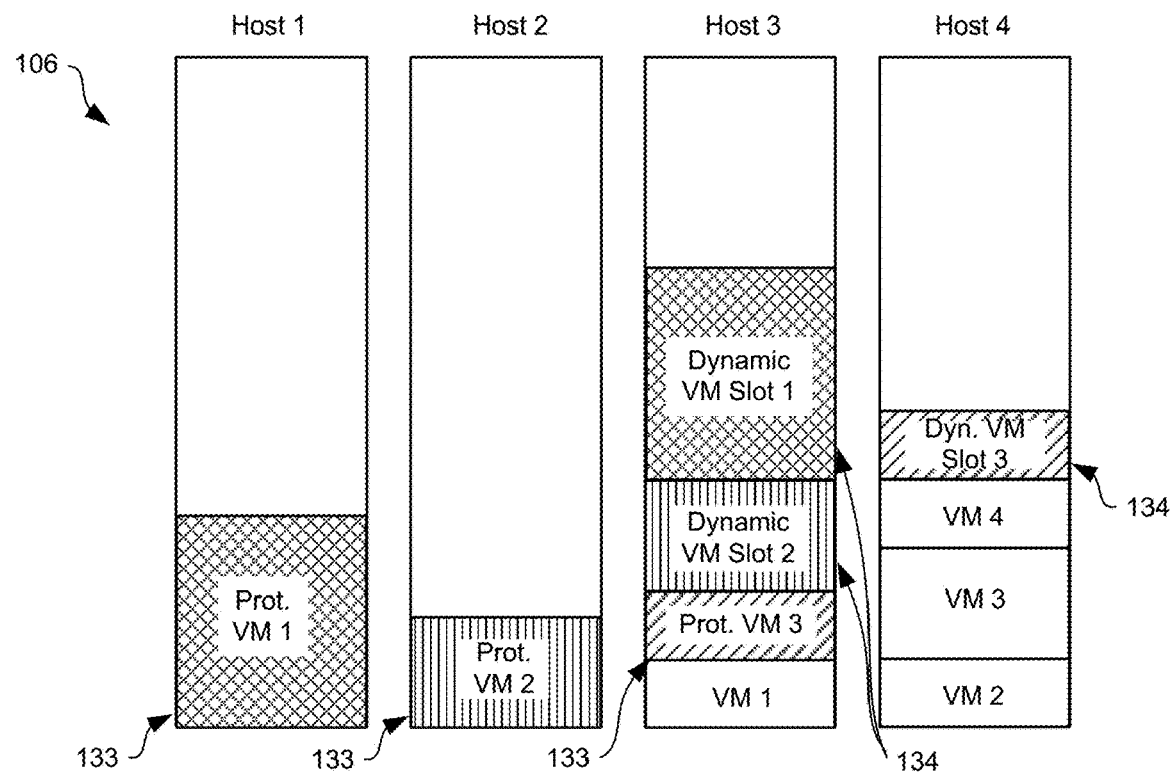
FIG. 2A is a drawing that illustrates an example cluster including virtual machines and dynamic virtual machine slots, according to the present disclosure.

FIG. 2A illustrates an example cluster 106 including hosts, protected VMs 133, dynamic VM slots 134, as well as other virtual machines. Hosts can include a host 1, a host 2, a host 3 and a host 4. Protected VMs 133 can include the protected VM 1, protected VM 2, and protected VM 3. Additional VMs include the VM 1, VM 2, VM 3, and VM 4. The additional VMs can be unprotected VMs. Protected VM 1 can be executed or reside in the host 1. Protected VM 2 can be executed in the host 2. Protected VM 3 can be executed in the host 3.

The protected VM 1, protected VM 2, and protected VM 3 is each indicated in the figure with a different size. The sizes can represent values for a particular hardware resource parameter. For example, the sizes can represent respective memory parameters for the protected VM 1, protected VM 2, and protected VM 3. Alternatively, the sizes can be indicative of respective compute parameters, network parameters, or storage parameters for the protected VM 1, protected VM 2, and protected VM 3.

The resource management service 142 can reserve resources for the protected VM 1 using the dynamic VM slot 1, reserve resources for the protected VM 2 using the dynamic VM slot 2, and reserve resources for the protected VM 3 using the dynamic VM slot 3. The resource management service 142 can maintain an anti-affinity rule between the protected VM 1 and the dynamic VM slot 1. Likewise, the resource management service 142 can maintain respective anti-affinity rules between the protected VM 2 and the dynamic VM slot 2, and between the protected VM 3 and the dynamic VM slot 3. As a result, a dynamic VM slot 134 is prohibited from residing on a host with the protected VM 133 that it protects. For example, while the protected VM 1 resides on host 1, the resource management service 142 prohibits the dynamic VM slot 1 from residing on the host 1. The resource management service 142 can periodically compare the location or host identity for the protected VM 1 with the location of the dynamic VM slot 1. If the locations are the same, then the resource management service 142 can remedy this conflict by moving the dynamic VM slot 1 or the protected VM 1 to another host.

If the host 1 fails, the resource management service 142 can execute the protected VM 1 in the host 3, using the resources reserved by the dynamic VM slot 1. In some cases, the resource management service 142 can also create a new dynamic VM slot 134 for the protected VM 1 as a result of the failure of host 1. In order to maintain the anti-affinity between the protected VM 1 and its dynamic VM slots 134, the new dynamic VM slot 134 can be created in an operational host separate from the host 3, such as the host 2 or the host 4.

Figure 2B:
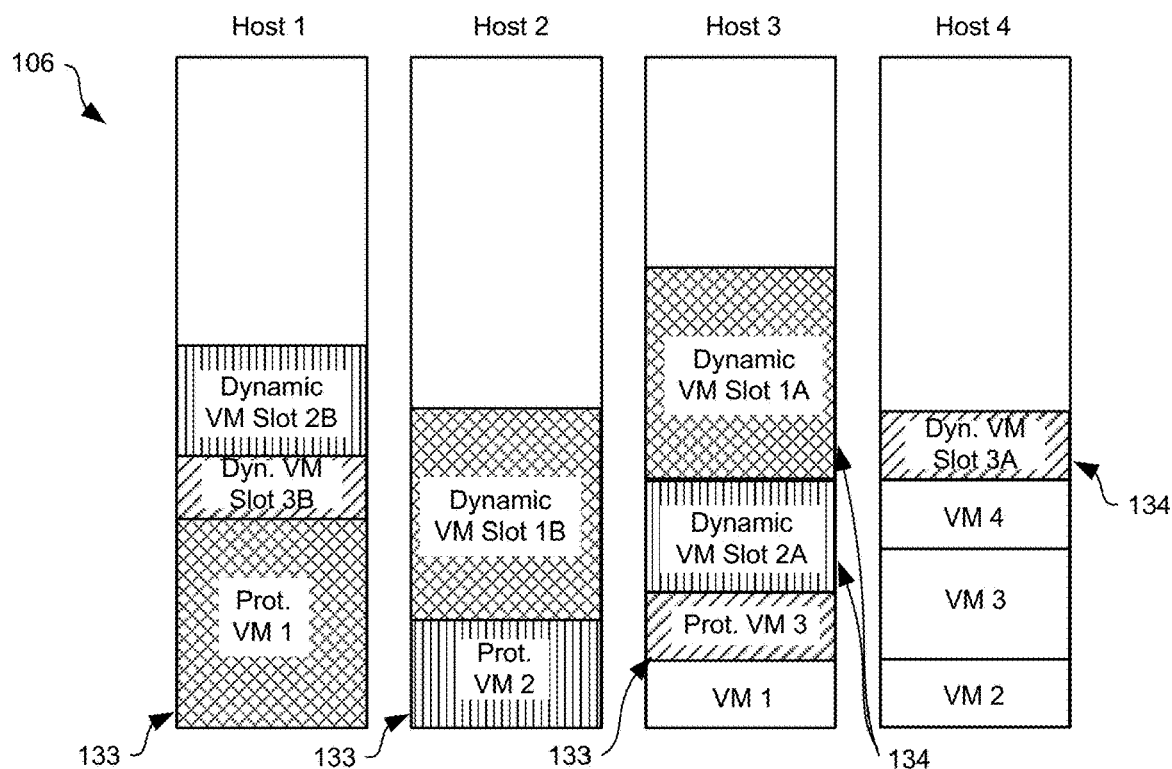
FIG. 2B is a drawing that illustrates an example cluster including virtual machines and dynamic virtual machine slots, according to the present disclosure.

FIG. 2B illustrates the example cluster 106 of FIG. 2A. However, a fault tolerance level for the cluster 106 has been increased to two faults, for example, in response to a provisioning or configuration operation. A client device 108 can access a management console of the resource management service 142 over the network 109. The management console can include a user interface element that when activated can update a configuration of the cluster 106 or the individual VMs to increase and/or decrease a fault tolerance level. The number of faults associated with a fault tolerance level can indicate how many dynamic VMs that should be associated with a protected VM. As a result, each of the protected VMs 133 are associated with two dynamic VM slots 134. For instance, the resource management service 142 can reserve resources for the protected VM 1 using both the dynamic VM slot 1A and the dynamic VM slot 1B. The resource management service 142 can maintain an anti-affinity rule between the protected VM 1, the dynamic VM slot 1A, and the dynamic VM slot 1B. Similarly, the resource management service 142 can reserve resources for the protected VM 2 using the dynamic VM slot 2A and the dynamic slot 2B. The resource management service 142 can reserve resources for the protected VM 3 using the dynamic VM slot 3A and the dynamic VM slot 3B.

As illustrated in this scenario, as the fault tolerance level increases, so does the number of dynamic VM slots 134 that are created within a cluster 106. Additionally, dynamic VM slots 134 can be created on hosts 115 that are separate from a host 115 in which a corresponding protected VM 133 is executed, thereby creating an additional layer of fault tolerance that is available to a protected VM 133 in the event of a host failure.

Figure 2C:
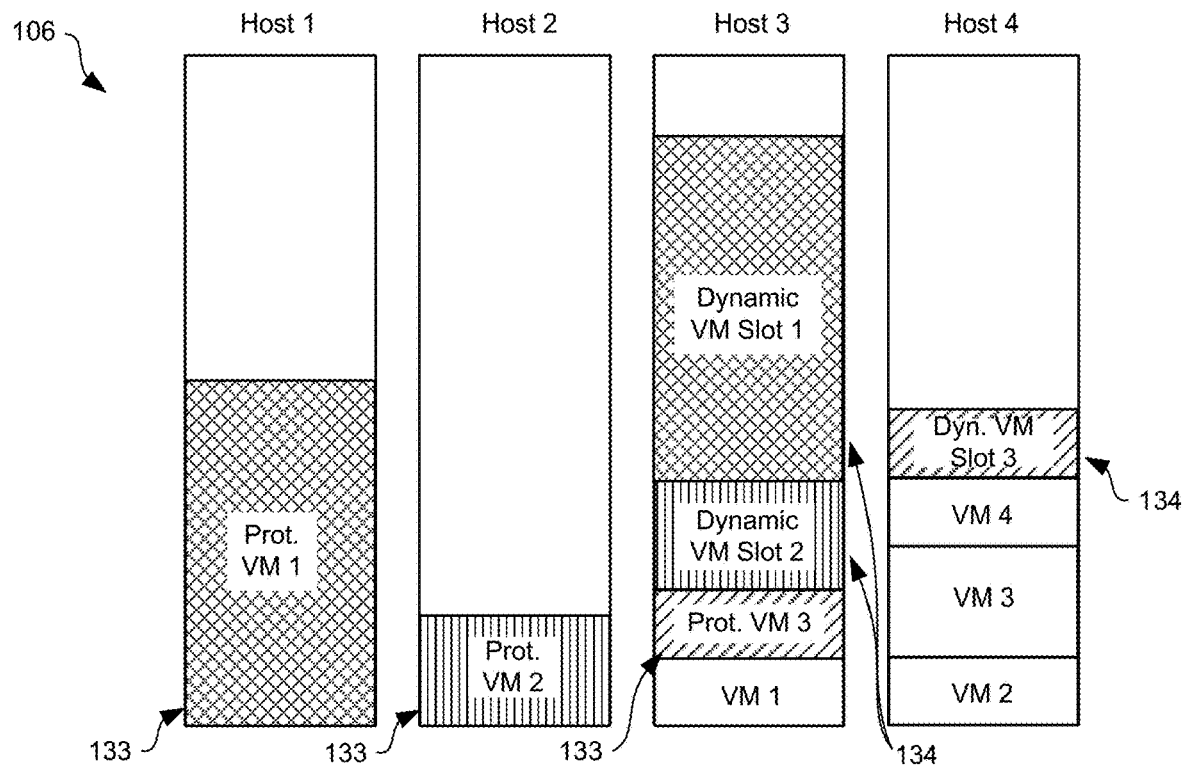
FIG. 2C is a drawing that illustrates an example cluster including virtual machines and dynamic virtual machine slots, according to the present disclosure.

FIG. 2C illustrates the example cluster 106 of FIG. 2A. However, a hardware resource parameter of the protected VM 1 has increased or changed. Memory, CPU, network, storage, or other hardware resource parameters have increased relative to the scenario depicted in FIG. 2A. A provisioning operation can modify the protected VM 1 to include an updated hardware resource configuration. The provisioning operation can be an automatic provisioning operation initiated by the resource management service 142 in response to an increased demand for functionalities provided using the protected VM 1. The resource management service 142 can identify that a VM record 132 indicates that the VM 1 is currently consuming over a threshold percentage of the memory (or another hardware resource) allocated to it. The resource management service 142 can update the hardware resource configuration to increase the memory allocated to the protected VM 1 based on the current consumption being above the threshold. Additionally, the resource management service 142 can identify that the VM record 132 indicates over a threshold number of user sessions. The resource management service 142 can update the hardware resource configuration to increase the hardware resources allocated to the protected VM 1 based on the current number of user sessions being above the threshold.

Alternatively, the provisioning operation can be a manual or user-initiated update to the hardware resource configuration of the protected VM 1. A client device 108 can access a management console of the resource management service 142 over the network 109. The management console can include user interface elements that can allow a user to update resource configuration parameters for a VM 1.

As a result of the updated hardware resource configuration, the resource management service 142 can determine that the hardware resource configuration for the protected VM 1 has been modified. In response to the updated hardware resource configuration, the resource management service 142 can update the dynamic VM slot 1 to match the updated hardware resource configuration for the protected VM 1. The resource management service can execute the protected VM 1 on host 1 using hardware resources that match or are equivalent to the hardware resource configuration for the protected VM 1. The dynamic VM slot 1 can reserve hardware resources of the host 3 that are equivalent to the hardware resources utilized by the protected VM 1 on host 1. As a result, in the case of a failure of host 1, the resource management service 142 can execute the protected VM 1 using the reserved hardware resources of the host 3.

Figure 2D:
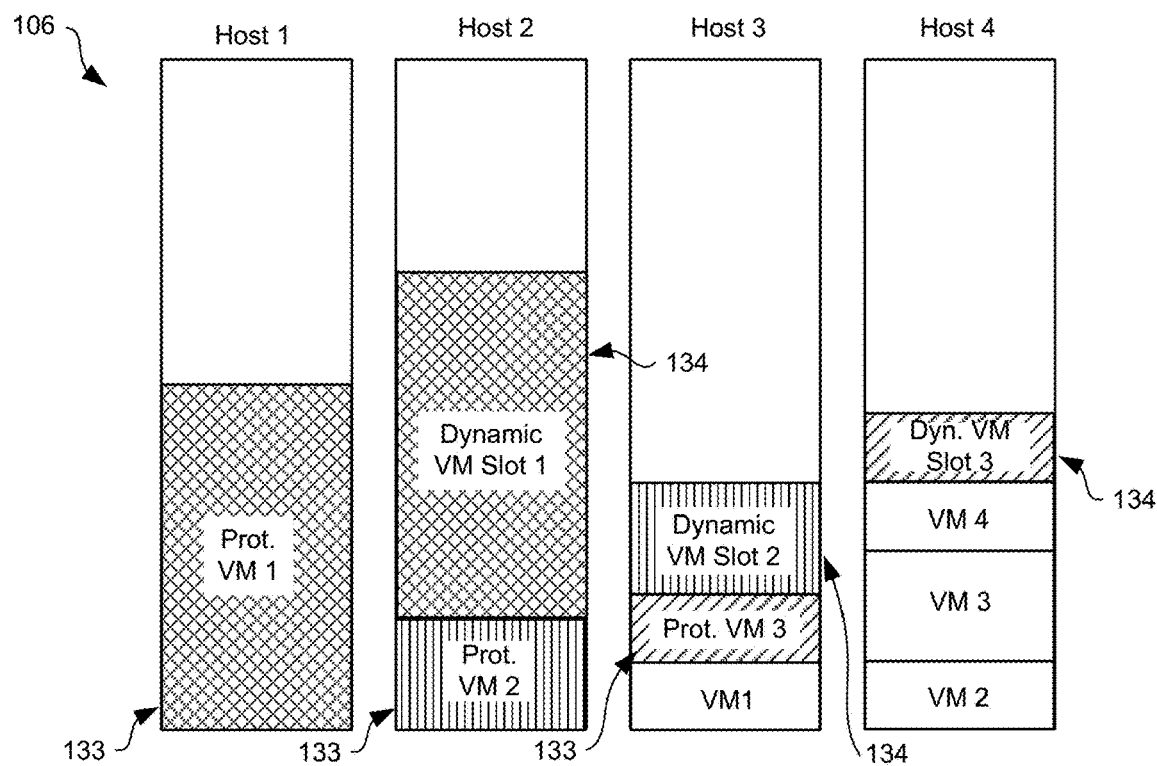
FIG. 2D is a drawing that illustrates an example cluster including virtual machines and dynamic virtual machine slots, according to the present disclosure.

FIG. 2D illustrates the example cluster 106 of FIG. 2A. As in FIG. 2C, a hardware resource parameter of the protected VM 1 has increased. However, this figure illustrates that the resource management service 142 can also balance host utilization, including resources reserved by executed VMs as well as dynamic VM slots 134. Based on the updated hardware resource configuration of the protected VM 1, the resource management service 142 can update the dynamic VM slot 1 to match the updated hardware resource configuration for the protected VM 1. In order to balance host utilization, the resource management service 142 can also move the dynamic VM slot 1 from the host 3 to the host 2. For instance, the resource management service 142 can monitor the resource utilization of each of the hosts 1-4. If the resources utilized by the host 3 are, by a threshold percentage, over an average resource utilization, mean, or other measure of resource utilization for the cluster 106 hosts 1-4, the resource management service 142 can move the dynamic VM slot 1 from the host 3 to the host 2. In some cases, the destination host can be a host that has the lowest current resource utilization.

An increase in the hardware resource parameters of the protected VM 1 can also cause the updated resource reservation of the dynamic VM slot 1 to exceed resources available for the host 3. If the resources reserved by the dynamic VM slot 1 are updated to exceed the available resources of the host 3, then the resource management service 142 can move the dynamic VM slot 1 from the host 3 to a destination host that includes sufficient resources, such as the host 2.

Figure 3:
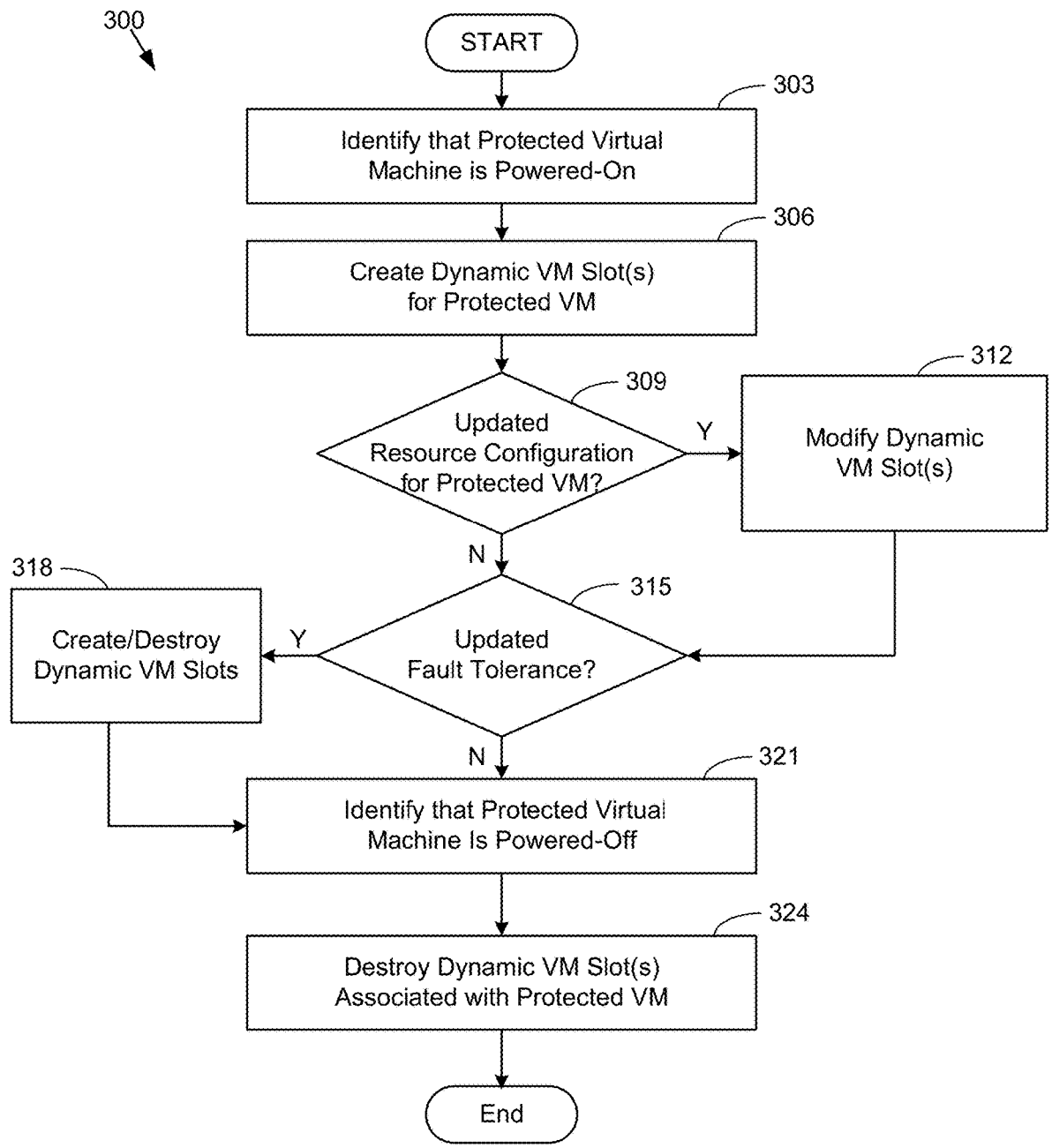
FIG. 3 is a flowchart illustrating an example of functionality implemented in the networked environment of FIG. 1, according to various examples of the present disclosure.

FIG. 3 is a flowchart 300 that illustrates functionalities implemented in the networked environment of FIG. 1. Generally, the flowchart 300 indicates how the resource management service 142 can provide virtual-machine-specific failover protection for a protected VM 133 using dynamic VM slots 134.

In step 303, the resource management service 142 can identify that a protected virtual machine 133 is powered-on. For example, the resource management service 142 can receive or identify a power-on request for a protected VM 133. A power-on request can be identified in a management console of the resource management service 142. In other words, the power-on request can be received from a client device 108 accessing the management console. Alternatively, a client device 108 can send a power-on request based on increased demand for the protected VM 133, such as an enterprise user requesting to access functionalities provided by the protected VM 133. The power-on request can include an identifier of the protected VM 133. In some instances, the power-on request can include an implementation time for the protected VM 133. The resource management service 142 can execute the protected virtual machine 133 in a host 115 at the implementation time.

In step 306, the resource management service 142 can create a dynamic VM slot 134 for the protected VM 133. In order to create the dynamic VM slot for the protected VM 133, the resource management service 142 can identify a resource configuration for the protected VM 133. The resource configuration of the protected VM 133 can include one or more resource parameters for the protected VM 133. Resource parameters can include one or more of a memory parameter, a computer parameter, a storage parameter, and a network parameter. The resource management service 142 can create a dynamic VM slot 134 that matches the resource configuration for the protected VM 133. The resource management service 142 can reserve resources comprising the dynamic VM slot 134 in a host 115 that is separate from the host of the protected VM 133. The resource management service 142 can maintain an anti-affinity rule between the dynamic VM slot 134 and the protected VM 133.

The resource management service 142 can identify a fault tolerance configuration and determine a number of dynamic VM slots 134 to create based on the fault tolerance configuration. The fault tolerance configuration can be specified for the cluster 106 or the protected VM 133. In some examples, the number of dynamic VM slots 134 can be equivalent to a number of tolerated host faults specified by the fault tolerance configuration. As a result, the resource management service 142 can create multiple dynamic VM slots 134 for a single protected VM 133.

In step 309, the resource management service 142 can determine whether a resource configuration for the protected virtual machine 133 is updated. The resource configuration for the protected virtual machine 133 can be updated by a provisioning operation. Provisioning operations can be entered through a client device 108 accessing the management console of the resource management service 142. Provisioning operations can increase, decrease, or otherwise alter the resource configuration for the protected VM 133. If the resource configuration for the protected virtual machine 133 is updated, the process can move to step 312. Otherwise, the process can move to step 315.

In step 312, the resource management service 142 can modify the resources reserved by the dynamic VM slot 134 of the protected VM 133. An updated resource reservation of the dynamic VM slot 134 can match the updated resource configuration of the protected virtual machine 133. Where there are multiple dynamic VM slots 134 for the protected VM 133, each of the dynamic VM slots 134 can be updated to match the updated resource configuration of the protected virtual machine 133.

In step 315, the resource management service 142 can determine whether a fault tolerance level is updated. The fault tolerance level for the protected virtual machine 133 can be updated through a client device 108 accessing the management console of the resource management service 142. A fault tolerance level can be increased or decreased for a configuration of the cluster 106, or a configuration of the protected VM 133. If the fault tolerance level for the protected virtual machine 133 is updated, the process can move to step 318. Otherwise, the process can move to step 321.

In step 318, the resource management service 142 can create or destroy a dynamic VM slot 134 for the protected VM 133. In response to an increased fault tolerance level, the resource management service 142 can create one or more dynamic VM slots 134 so that the total number of dynamic VM slots 134 matches a number of faults to tolerate specified by the fault tolerance level. In response to a decreased fault tolerance level, the resource management service 142 can destroy or delete one or more dynamic VM slots 134 so that the total number of dynamic VM slots 134 matches the number of faults to tolerate.

In step 321, the resource management service 142 can determine that a protected virtual machine 133 is powered-on. For example, the resource management service 142 can receive a power-off request for the protected virtual machine 133. A power-off request can be identified in a management console of the resource management service 142. In other words, the power-off request can be received from a client device 108 accessing the management console. Alternatively, a client device 108 can send a power-off request based on decreased demand for the protected VM 133, such as an enterprise user no longer accessing functionalities provided by the protected VM 133. The power-off request can include an identifier of the protected VM 133. In some instances, the power-on request can include a deactivation time for the protected VM 133. The resource management service 142 can deactivate and remove the protected virtual machine 133 from the host 115 at the deactivation time.

In step 324, the resource management service 142 can destroy the dynamic VM slots 134 of the protected VM 133. The dynamic VM slots 134 can be destroyed by removing the reservation of resources comprising the dynamic VM slots 134. In some examples, this includes deletion of data comprising the dynamic VM slots 134 from their respective hosts 115.

Figure 4:
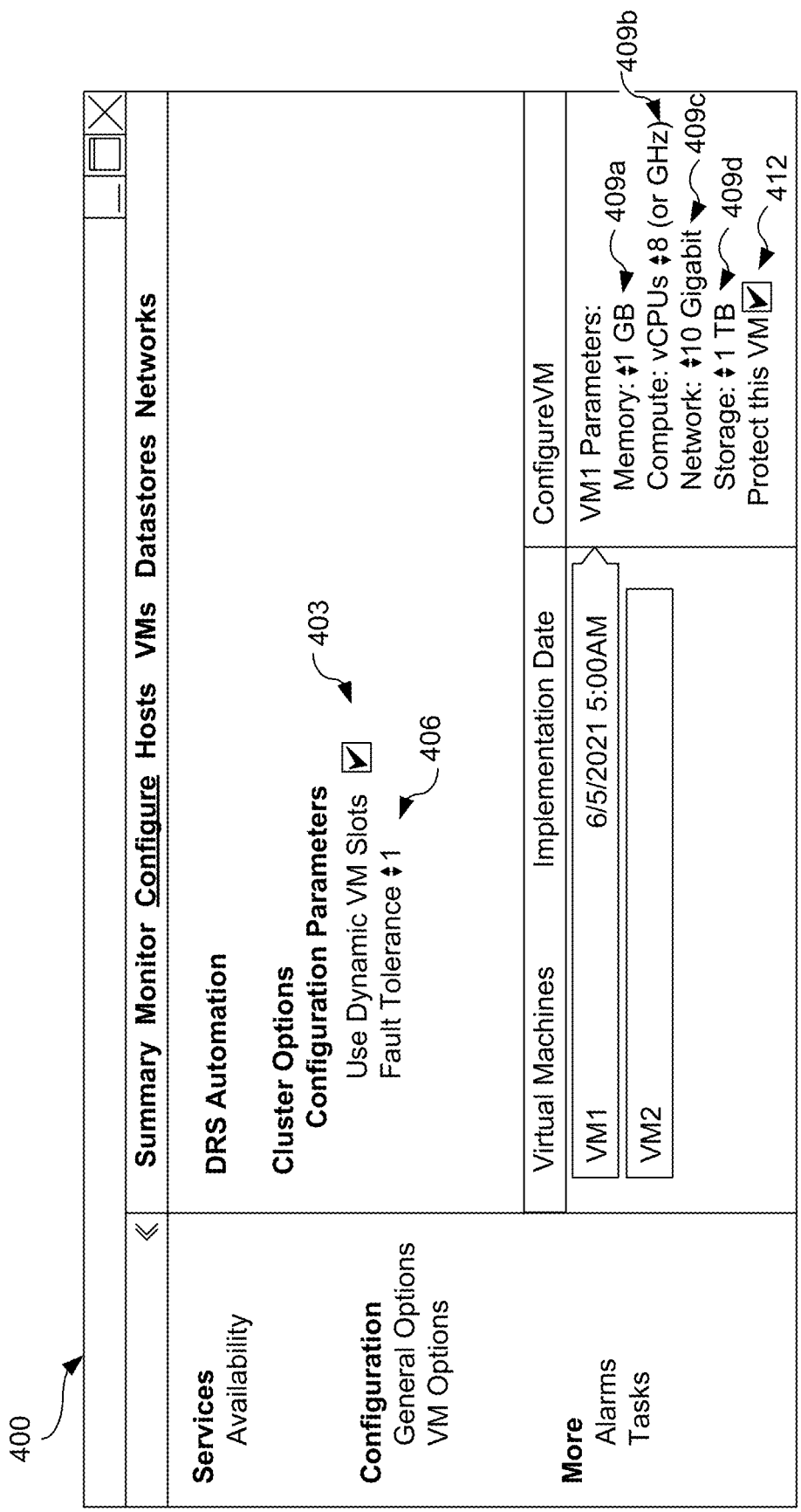
FIG. 4 is a drawing that illustrates a user interface generated by components of the networked environment of FIG. 1, according to various examples of the present disclosure.

FIG. 4 is a drawing that illustrates a user interface 400 of a management console of the resource management service 142. A client device 108 can access the user interface 400 over the network 109. The user interface 400 can include a user interface element 403, a user interface element 406, user interface elements 409, and a user interface element 412. The user interface element 403, when selected, can update a configuration of the cluster 106 to enable dynamic VM slots 134 for failover protection of protected VMs 133 in the cluster 106. The user interface element 406, when activated, can update a configuration of the cluster 106 to increase and/or decrease a fault tolerance level of the cluster 106. The user interface elements 409a-409d can allow a user to enter or update resource configuration parameters for a VM 1. For example, the user interface element 409a, when activated, can increase or decrease a memory parameter of the resource configuration of the VM 1. The user interface element 409b, when activated, can increase or decrease a compute parameter of the resource configuration of the VM 1. The user interface element 409c, when activated, can increase or decrease a network parameter of the resource configuration of the VM 1. The user interface element 409d, when activated, can increase or decrease a storage parameter of the resource configuration of the VM 1. The user interface element 412, when selected, can cause the VM 1 to be a protected VM 133. The user interface 400 can also show an implementation time for the VM 1. A user interface element can also be provided to initially enter, or update, the implementation time of the VM 1.

One or more or more of the components described herein that includes software or program instructions can be embodied in any non-transitory computer-readable medium for use by or in connection with an instruction execution system such as a processor in a computer system or other system. The non-transitory computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

The invention claimed is:

1. A system, comprising:
   a cluster comprising a plurality of hosts;
   a plurality of virtual machines executing in the cluster; and
   a data store comprising executable instructions, wherein the instructions, when executed by at least one processor, cause at least one computing device to at least:
   receive a power-on request associated with a protected virtual machine of the plurality of virtual machines, a configuration of the protected virtual machine indicating that virtual-machine-specific failover protection is enabled;
   execute the protected virtual machine on a first host of the cluster;
   create, on a second host of the cluster, a dynamic virtual machine slot for the protected virtual machine, the dynamic virtual machine slot being created to match a hardware resource configuration of the protected virtual machine;
   maintain an anti-affinity rule between the protected virtual machine and the dynamic virtual machine slot, the anti-affinity rule prohibiting the dynamic virtual machine slot and the protected virtual machine from residing on a same host;
   create, on a third host of the cluster, a second dynamic virtual machine slot for the protected virtual machine matching the hardware resource configuration of the protected virtual machine based on a number of failures to tolerate being greater than one, wherein the second dynamic virtual machine slot is created on the third host of the cluster in response to the anti-affinity rule;
   identify a provisioning operation that modifies the protected virtual machine to require an updated hardware resource configuration, the updated hardware resource configuration comprising a memory or a CPU configuration; and
   update the dynamic virtual machine slot and the second dynamic virtual machine slot to match the updated hardware resource configuration.

2. The system of claim 1, wherein the dynamic virtual machine slot is moved from the second host to a fourth host in order to match the updated hardware resource configuration.

3. The system of claim 1, wherein the instructions, when executed by the at least one processor, further cause the at least one computing device to at least:
   identify a failure of the first host; and
   in response to the failure of the first host, execute the protected virtual machine in the dynamic virtual machine slot on the second host.

4. The system of claim 1, wherein the instructions, when executed by the at least one processor, further cause the at least one computing device to at least:

determine that the protected virtual machine is powered off; and destroy the dynamic virtual machine slot based on the protected virtual machine being powered off.

5. The system of claim 1, wherein the hardware resource configuration comprises a central processing unit (CPU) configuration and a memory configuration.

6. A non-transitory computer-readable medium comprising executable instructions, wherein the instructions, when executed by at least one processor, cause at least one computing device to at least:

receive a power-on request associated with a protected virtual machine, a configuration of the protected virtual machine indicating that virtual-machine-specific failover protection is enabled;

execute the protected virtual machine on a first host of a cluster;

create, on a second host of the cluster, a dynamic virtual machine slot for the protected virtual machine, the dynamic virtual machine slot being created to match a hardware resource configuration of the protected virtual machine;

maintain an anti-affinity rule between the protected virtual machine and the dynamic virtual machine slot, the anti-affinity rule prohibiting the dynamic virtual machine slot and the protected virtual machine from residing on a same host;

create, on a third host of the cluster, a second dynamic virtual machine slot for the protected virtual machine matching the hardware resource configuration of the protected virtual machine based on a number of failures to tolerate being greater than one, wherein the second dynamic virtual machine slot is created on the third host of the cluster in response to the anti-affinity rule;

identify a provisioning operation that modifies the protected virtual machine to require an updated hardware resource configuration, the updated hardware resource configuration comprising a memory or a CPU configuration; and update the dynamic virtual machine slot and the second dynamic virtual machine slot to match the updated hardware resource configuration.

7. The non-transitory computer-readable medium of claim 6, wherein the dynamic virtual machine slot is moved from the second host to a fourth host in order to match the updated hardware resource configuration.

8. The non-transitory computer-readable medium of claim 6, wherein the instructions, when executed by the at least one processor, further cause the at least one computing device to at least:

identify a failure of the first host; and in response to the failure of the first host, execute the protected virtual machine in the dynamic virtual machine slot on the second host.

9. The non-transitory computer-readable medium of claim 6, wherein the instructions, when executed by the at least one processor, further cause the at least one computing device to at least:

determine that the protected virtual machine is powered off; and destroy the dynamic virtual machine slot based on the protected virtual machine being powered off.

10. The non-transitory computer-readable medium of claim 6, wherein the hardware resource configuration comprises a central processing unit (CPU) configuration and a memory configuration.

11. A method comprising:

receiving a power-on request associated with a protected virtual machine, a configuration of the protected virtual machine indicating that virtual-machine-specific failover protection is enabled;

executing the protected virtual machine on a first host of a cluster;

creating, on a second host of the cluster, a dynamic virtual machine slot for the protected virtual machine, the dynamic virtual machine slot being created to match a hardware resource configuration of the protected virtual machine;

maintaining an anti-affinity rule between the protected virtual machine and the dynamic virtual machine slot, the anti-affinity rule prohibiting the dynamic virtual machine slot and the protected virtual machine from residing on a same host;

create, on a third host of the cluster, a second dynamic virtual machine slot for the protected virtual machine matching the hardware resource configuration of the protected virtual machine based on a number of failures to tolerate being greater than one, wherein the second dynamic virtual machine slot is created on the third host of the cluster in response to the anti-affinity rule;

identify a provisioning operation that modifies the protected virtual machine to require an updated hardware resource configuration, the updated hardware resource configuration comprising a memory or a CPU configuration; and update the dynamic virtual machine slot and the second dynamic virtual machine slot to match the updated hardware resource configuration.

12. The method of claim 11, wherein the dynamic virtual machine slot is moved from the second host to a fourth host in order to match the updated hardware resource configuration.

13. The method of claim 11, further comprising:
identifying a failure of the first host; and
in response to the failure of the first host, executing the protected virtual machine in the dynamic virtual machine slot on the second host.

14. The method of claim 11, further comprising:
determining that the protected virtual machine is powered off; and
destroying the dynamic virtual machine slot based on the protected virtual machine being powered off.

* * * * *